United States Patent
Kubo et al.

[11] Patent Number: 5,104,750
[45] Date of Patent: Apr. 14, 1992

[54] MAGNETIC RECORDING MEDIUM

[75] Inventors: Osamu Kubo; Tutomu Nomura, both of Yokohama; Tadashi Ido, Ebina, all of Japan

[73] Assignee: Kabushiki Kaisha Toshiba, Kawasaki, Japan

[21] Appl. No.: 501,719

[22] Filed: Mar. 30, 1990

[30] Foreign Application Priority Data

Mar. 31, 1989 [JP] Japan ................................. 1-81935

[51] Int. Cl.$^5$ ............................................. G11B 23/00
[52] U.S. Cl. ............................. 428/694; 252/62.63; 428/900
[58] Field of Search ............................. 428/694, 900; 252/62.59, 62.63, 62.58

[56] References Cited

U.S. PATENT DOCUMENTS 4,770,933 9/1988 Kitahata et al. .................. 428/694
4,806,429 2/1989 Nagai et al. ....................... 252/62.63
4,851,292 7/1989 Nagai et al. ....................... 252/62.63

Primary Examiner—Paul J. Thibodeau
Attorney, Agent, or Firm—Oblon, Spivak, McClelland, Maier & Neustadt

[57] ABSTRACT

In the magnetic recording medium according to the present invention comprising a magnetic recording medium layer where a magnetic paint containing Ba ferrite magnetic powder is coated on the substrate, Hc in the oriented direction ranging from 900 to 1500 Oe, the squareness in the oriented direction being 0.80 or more, and the ratio Hr(90°)/Hr(0°) of the remanence coercive force Hr(0°) in the oriented direction (0°) and the remanence coercive force Hr (90°) in the direction (90°) perpendicular to the oriented direction ranging from $1 < Hr(90°)/Hr(0°) \leq 2.6 - 10^{-3}$. Hc are controllable.

4 Claims, 1 Drawing Sheet

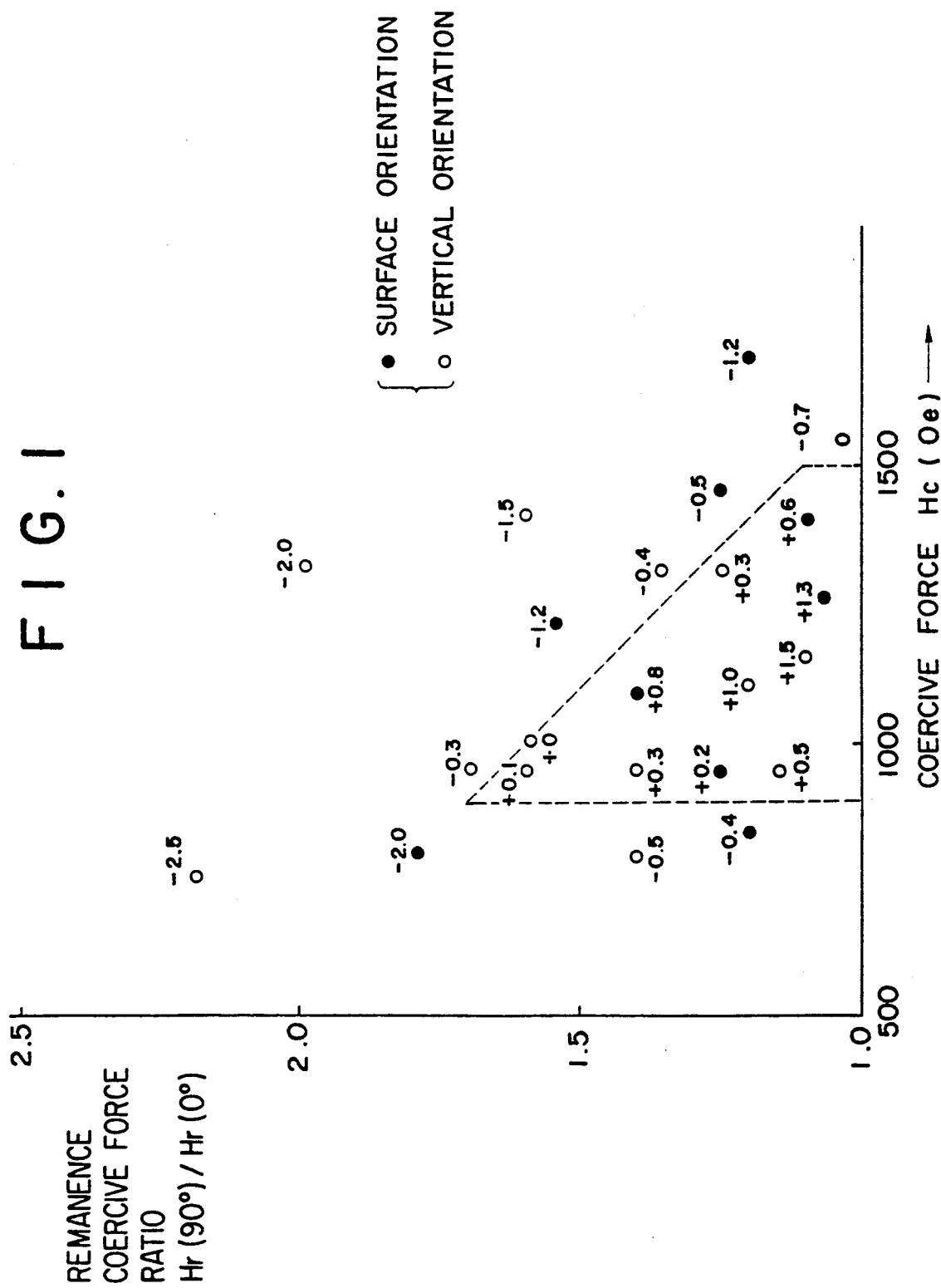

MAGNETIC RECORDING MEDIUM

BACKGROUND OF THE INVENTION

1. Field of The Invention

The present invention relates to a magnetic recording medium, specifically to a coated type ferrite magnetic recording medium whose reproduction output is high in a short wave band.

2. Description of Prior Art

Generally, a coated type magnetic recording medium is composed of a substrate comprising, for example, a polyethylene terephthalate film and the like and a magnetic medium layer comprising ferromagnetic substance powder and binder formed thereon. As the ferromagnetic substance powders used for the coated type magnetic recording mediums, $\gamma$-$Fe_2O_3$, Co adherent $\gamma$-$Fe_2O_3$, $CrO_2$, needle shaped magnetic substance powders such as metal Fe, and Ba ferrite having plate shaped crystals have been known. Particularly, with respect to the Ba ferrite particles, since the easily magnetizing axis is located perpendicular to the plate surface, by arranging the plate surface of the Ba ferrite particles in parallel with the substrate surface, a magnetic recording medium suitable for the vertical magnetic recording system which enables data to be recorded in a high density can be formed.

The recording resolution of the conventional surface oriented medium using needle shaped particles depends on the length of the longer axis of the needle shaped particles (normally, 0.2 to 0.4 $\mu$m). On the other hand, the recording resolution of the medium where the Ba ferrite particles are surface-oriented depends on the plate thickness of the ferrite particles (normally, 0.005 to 0.03 $\mu$m). Thus, the Ba ferrite which is used for the surface oriented recording medium allows the recording density to be remarkably improved.

As the Ba ferrites which satisfy the above conditions, M type Ba ferrite $BaFe_{12}O_{19}$ and W type ferrite $BaMe_2Fe_{16}O_{27}$ (where Me is a bivalent metal) wherein the easily magnetizing axis is located perpendicular to the plate surface of the crystals have been known as well as types where the atoms of the M type or W type Ba ferrites are partially replaced with other atoms. These types of the magnetic recording mediums are produced in the following manner. The Ba ferrite magnetic powder described above is mixed with a synthetic resign type binder in a solvent. They are coated on the surface of a nonmagnetic substrate such as a polyethylene terephthalate film. The magnetization easy axis of the Ba ferrite in the coated layer is oriented in parallel with or perpendicular to the surface of the substrate and then dried.

However, to satisfactorily obtain a recording medium with the high recording density using the Ba ferrite magnetic ferrite powder, like the conventional surface oriented recording medium, it is desired to provide as higher orientation ratio and higher coercive force as possible. However, we found that although the high orientation ratio (squareness) and the high coercive force satisfy the necessary conditions, but does not satisfy sufficient conditions for improving the output through our long time study. Particularly, in the short wave band, to obtain a high output, we found that it is necessary to control the ratio Hr(90°) Hr(0°) of the remanence coercive force Hr(0°) in the oriented direction (0°) and the remanence coercive force (90°) perpendicular to the oriented direction with respect to the magnetic fine structure of the recording medium as well as increasing the coercive force Hc and the squareness of the recording medium and thereby made the present invention.

The remanence coercive force Hr will be described in the following. Hr($\theta$) represents the strength of the magnetic field where the magnetization of the magnetic powder is irreversibly reversed when the magnetic field is applied with an angle of $\theta$ against the easily magnetizing axis of the magnetic powder. According to our study, it becomes obvious that the remanence coercive force Hr(90°) / Hr(0°) closely relates to the aggregation state of the magnetic powder of the magnetic recording medium and the size of the magnetic powder particles. The value of the remanence coercive force can be controlled to a considerable extent by selecting the size of the magnetic powder particles, the dispersion time for dispersing the magnetic powder particles in binder, the rotation speed of the dispersing machine, the type of the dispersing agent, the orientation process conditions, and so forth.

The present invention was made according to the above fact we found. An object of the present invention is to provide a magnetic recording medium which allows a large reproduction output in a short wave band to be obtained in high density by properly controlling the coercive force of a Ba ferrite type magnetic medium, the squareness, and Hr(90°) Hr(0°), the magnetic recording medium being able to be easily produced.

SUMMARY OF THE INVENTION

In the magnetic recording medium according to the present invention comprising a magnetic recording medium layer where a magnetic paint containing Ba ferrite magnetic powder is coated on the substrate, Hc in the oriented direction ranging from 900 to 1500 Oe, the squareness in the oriented direction being 0.80 or more, and the ratio Hr(90°) / Hr(0°) of the remanence coercive force Hr(0°) in the oriented direction (0°) and the remanence coercive force Hr (90°) in the direction (90°) perpendicular to the oriented direction ranging from $1 < Hr(90°)/Hr(0°) \leq 2.6 - 10^{-3} \cdot Hc$ are controllable.

BRIEF DESCRIPTION OF THE DRAWING

The figure is a schematic showing a correlation between the coercive force of the magnetic recording medium using Ba ferrite powder according to the present invention as magnetic powder and the ratio of the remanence coercive force Hr(0°) in the oriented direction (0°) and the remanence coercive force Hr (90°) in the direction (90°) perpendicular to the oriented direction.

DETAILED DESCRIPTION OF PREFERRED EMBODIMENT

An embodiment of the magnetic recording medium according to the present invention will be described in the following. As magnetic powders used for producing the magnetic recording medium, the M type or W type Ba ferrites have been known. However, it is preferred to use the following ultrafine particle powder of ion exchanger.

$BaO \cdot n \{(Fe_{1-m}M_m)_2O_3\}$ where M is at least one element selected from Co, Ti, Zn, Sn, Ni, Mn, In, Cu, Ge, Zr, Hf, V, Ta, Al, Cr, and Sb; m is 0.2 or less; and n is 5 or more.

The coercive force in the oriented direction of the Ba ferrite coated type magnetic recording medium according to the present invention should range from 900 Oe to 1500 Oe inclusive, because metal heads using high Hc mediums which can record signals have been developed, with these heads large reproduction outputs being obtained using mediums whose Hc ranges from 900 Oe to 1500 Oe inclusive. However, when Hc exceeds 1500 Oe, the head is saturated, thereby decreasing the reproduction output.

On the other hand, in the present invention, the squareness of the coated type magnetic recording medium is set to 0.8 or more. When the squareness is less than 0.8, the reproduction output in the short wave band is not advantageously increased.

In the present invention, the ratio of the remanence coercive force Hr(0°) in the oriented direction (0°) of the coated type magnetic recording medium and the remanence coercive force Hr(90°) in the direction (90°) perpendicular to the oriented direction is set to the following range.

$$1 < Hr(90°) / Hr(0°) \leq 2.6 \times 10^{-3} \cdot Hc$$

where Hc represents the coercive force of the coated type magnetic recording medium in the oriented direction.

Hr(90°) / Hr(0°) of the highly oriented Ba ferrite coated type magnetic recording medium depends on the dispersion state of the magnetic powder thereof or the size or shape of the magnetic powder used thereof. We found that by controlling such values in predetermined ranges, a large output can be obtained.

In other words, the preferred range of Hr(90°) / Hr(0°) depends on the coercive force Hc of the magnetic recording medium, which nearly ranges $1 < Hr(90°) / Hr(0°) \leq 2.6 - 10^{-3} \cdot Hc$. For example, when Hc in the oriented direction is 900 Oe, it is preferred that $1 < Hr(90°) / Hr(0°) \leq 1.7$. When the coercive force Hc is 1500 Oe, it is preferred that $1 < Hr(90°) / Hr(0°) \leq 1.1$.

The magnetic paint used in producing the coated type magnetic recording medium layer for embodying the present invention is normally mixed with a binder resin. In addition, when necessary, additives such as a dispersing agent, a lubricant, and an abrasive are added.

As the binder resins, a copolymerization of vinyl chloride and vinyl acetate, a polyurethane resin, a copolymerization of vinyl chloride, vinyl acetate, and sulfonated vinyl, nitrocellulose, a polycarbonate resin, a polyacrylic resin, a phenol resin, a polyether resin, a phenoxy resin, a melamine resin, a vinyl butyral resin, a furan resin, a vinyl alcohol resin, and so forth have been known.

As the dispersing agents, various anion surface active agents such as lecithin, anion surface active agents, cation surface active agents, nonionic surface active agent, a silane coupling agent, a titanium coupling agent and so forth can be used.

As the lubricants, higher fatty acid, alkyl ester type higher fatty acid, silicone type, hydrocarbon fluoride type, or a compound thereof can be used.

As the hardening agent of the binder resin described above, it is possible to add polyhydric isocyanate. As the abrasive described above, it is also possible to add a hard fine powder whose Mohs' hardness is 5 or more such as $Cr_2O_3$, $Al_2O_3$, SiC, $ZrO_2$ and the like. In addition, as the solvents used to mix paints, toluene, xylene, cyclohexane, methylbutyl ketone, methylisobutyl ketone, nitropropane, tetrahydrofuran, and isopropyl alcohol which solve the above binder resins have been known.

On the other hand, as the substrates, besides a polyethylene terephthalate film and a polyamide resin, a nonmagnetic metal plate such as an aluminum plate can be used.

The magnetic recording medium according to the present invention is produced in the following manner. A hardening agent such as an isocyanate compound is added to the magnetic paint mixed in the manner described above. After they are properly agitated and mixed, by coating them on the substrate such as the polyethylene terephthalate file and the like so as to form the paint layer whose thickness becomes around 1 to 5 $\mu$m. Then, perform the orientation process for the paint layer by predetermined means and dry it. Thus, the magnetic recording medium according to the present invention can be produced.

With respect to the magnetic recording medium according to the present invention, produced in the manner described above, the coercive force Hc in the oriented direction ranges from 900 Oe to 1500 Oe inclusive and the squareness in the oriented direction is 0.80 or more, the magnetic recording medium being of a high coercive force, high orientation type. In addition, by properly controlling the ratio Hr(90°) / Hr(0°) of the remanence coercive force Hr(0°) in the oriented direction (0°) and the remanence coercive force Hr(90°) in the direction (90°) perpendicular to the oriented direction, which depends on the dispersion state and the particle size of the magnetic powder of the paint, in a predetermined range, a large reproduction output in the short wave band can be obtained in high density.

The squareness and the remanence coercive force of the present embodiment are obtained in the following manners.

Squareness

In the magnetization curve when a magnetic field of 10 k Oe in the oriented direction of a magnetic recording medium is produced, the ratio Mr / $M_{10}$ of the magnetization value $M_{10}$ and the remanence magnetization Mr is defined as the squareness of the magnetic recording medium. In the case of the magnetic recording medium which is oriented perpendicular to the substrate, the squareness is obtained from the magnetization curve where the diamagnetic field compensation is conducted for $4\pi LM$.

Remanence coercive force

After a magnetic field of 10 k Oe is produced for a magnetic recording medium, the magnetic filed is cleared so as to residually magnetize the magnetic recording medium. Then, produce the magnetic field H in the reverse direction for the magnetic recording medium. After that, clear the magnetic field H to 0 and measure the remanence magnetization amount Mr (H). By repeating these operations, the magnetic field H where Mr becomes 0 is defined as the remanence coercive force. The remanence coercive forces Hr in the oriented direction and in the direction perpendicular thereto (for a surface oriented recording medium, the direction which is inside the surface and which is perpendicular to the traveling direction of the medium) are defined as Hr(0°) and Hr(90°), respectively. For a vertically oriented medium, assuming that the magnetization of the medium is M when H=Hr, using $Hr(0°)=Hr-4\pi M$, the remanence coercive force is obtained.

Ba ferrite magnetic powder whose average particle diameter ranges from 50 to 300 nm, whose aspect ratio (particle diameter / thickness) ranges from 3 to 6, whose coercive force ranges from 500 to 2000 Oe, and whose saturation magnetization is 50 emu/g or more is mixed with a binder, a dispersing agent, a hardening agent, and a lubricant along with a solvent in a dispersing machine by changing the speed and dispersing time thereof and thereby a magnetic paint is produced.

The paint is coated on a polyethylene terephthalate film whose thickness is 9 μm, the paint being passed through a surface oriented magnetic field and a vertically oriented magnetic field. After that, in the magnetic fields, the paint is dried, calendered, and cured and thereby the magnetic recording medium is obtained.

The reproduction output at the recording wave length $\lambda=0.5$ μm of the magnetic recording medium is measured using an MIG head. The resultant values are shown in FIG. 1 as the correlation of the coercive force of the magnetic recording medium and $Hr(90°)/Hr(0°)$ where the values of the reproduction outputs are represented in dB according to the metal magnetic powder coated magnetic recording medium of the surface oriented type (Hc=1500 Oe). "O" and "■" represent the results of the vertically oriented medium and the surface oriented medium, respectively (in any type, the squareness ranges from 0.82 to 0.85). The box made with the dot line in the figure represents the range of $$1 < Hr(90°)/Hr(0°) \leq 2.6 - 10^{-3} \cdot Hc.$$

As described in the embodiment, regardless of whether the magnetic recording medium according to the present invention is of the surface oriented type and vertically oriented type, by setting the following conditions Hc=900 to 1500 Oe and $1 < Hr(90°)/Hr(0°) \leq 2.6 - 10^{-3} \cdot Hc$ a reproduction output superior to those by the conventional metal coated magnetic recording mediums can be obtained. In other words, to satisfactorily obtain a high recording density in a magnetic recording medium using Ba ferrite magnetic powder, like the conventional surface recording mediums, the orientation ratio (squareness) and coercive force should be as high as possible for improving the output. However, they are only necessary conditions. To obtain a high output particularly in the short wave band, besides increasing the coercive force Hc and the squareness of the medium, it is necessary to select the ratio $Hr(90°)/Hr(0°)$ of the remanence coercive force $Hr(0°)$ in the oriented direction (0°) and the remanence coercive force Hr (90°) in the direction (90°) perpendicular to the oriented direction, which relates to the magnetic fine structure of the medium. Thus, a large reproduction output is obtained in the short wave band and a desired high density recording can be easily accomplished.

What is claimed is:

1. A magnetic recording medium having a Ba ferrite coated magnetic recording material layer oriented vertically on the surface of a substrate or in the surface direction thereof,
   wherein the coercive force Hc in the oriented direction ranges from 900 Oe to 1500 Oe, the squareness in the oriented direction is 0.80 or more, and the ratio of the remanence coercive force Hr(0°) in the oriented direction (0°) and the remanence coercive force Hr(90°) in the direction (90°) perpendicular to the oriented direction is in the following range:

$$1 < Hr(90°)/Hr(0°) \leq 2.6 - 10^{-3} \cdot Hc$$

2. The magnetic recording medium of claim 1, wherein the Ba ferrite is represented by the general formula;

$$BaO \cdot n\{(Fe_{1-m}M_m)_2O_3\}$$

(wherein M is at least one element selected from Co, Ti, Zn, Sn, Ni, Mn, In, Cu, Ge, Zr, Hf, V, Ta, Al, Cr, and Sb;

m is 0.2 or less;

and n is 5 or more).

3. The magnetic recording medium of claim 1, wherein the magnetic recording material layer is formed by coating the substrate with a magnetic paint, the magnetic paint comprising at least a Ba ferrite magnetic powder and a binder dissolved in a solvent.

4. The magnetic recording medium of claim 3, the magnetic paint further comprising a dispersing agent, a lubricant, and an abrasive.

* * * * *

UNITED STATES PATENT AND TRADEMARK OFFICE
CERTIFICATE OF CORRECTION

PATENT NO. : 5,104,750
DATED : April 14, 1992
INVENTOR(S) : Kubo et al

It is certified that error appears in the above-indentified patent and that said Letters Patent is hereby corrected as shown below:

Column 1, line 48, change "resign" to --resin--;
 line 65, change "Hr(90°) Hr(0°)" to
 --Hr(90°)/Hr(0°)--.

Column 2, line 28, change "Hr(90°) Hr(0°)" to
 --Hr(90°)/Hr(0°)--.

Signed and Sealed this

Thirty-first Day of August, 1993

Attest:

BRUCE LEHMAN

Attesting Officer      Commissioner of Patents and Trademarks